United States Patent
Madams et al.

(10) Patent No.: US 7,844,674 B2
(45) Date of Patent: Nov. 30, 2010

(54) ARCHITECTURE FOR GENERAL PURPOSE TRUSTED PERSONAL ACCESS SYSTEM AND METHODS THEREFOR

(75) Inventors: Peter H. C. Madams, Novato, CA (US); Joseph H. Salesky, Novato, CA (US)

(73) Assignee: ClairMail Inc., San Rafael, CA (US)

( * ) Notice: Subject to any disclaimer, the term of this patent is extended or adjusted under 35 U.S.C. 154(b) by 882 days.

(21) Appl. No.: 11/280,140

(22) Filed: Nov. 15, 2005

(65) Prior Publication Data
US 2006/0123092 A1   Jun. 8, 2006

Related U.S. Application Data

(60) Provisional application No. 60/633,327, filed on Dec. 3, 2004.

(51) Int. Cl.
G06F 15/16 (2006.01)
G06F 9/00 (2006.01)
H04L 9/32 (2006.01)

(52) U.S. Cl. .......... 709/206; 709/219; 726/12; 713/170

(58) Field of Classification Search .......... 709/238, 709/206, 219; 713/170; 726/12
See application file for complete search history.

(56) References Cited

U.S. PATENT DOCUMENTS

| | | | |
|---|---|---|---|
| 5,684,951 A * | 11/1997 | Goldman et al. ............ | 726/6 |
| 5,740,361 A * | 4/1998 | Brown ........................ | 726/5 |
| 5,809,415 A | 9/1998 | Rossmann | |
| 5,912,887 A | 6/1999 | Sehgal | |
| 5,951,694 A | 9/1999 | Choquier et al. | |
| 6,138,162 A | 10/2000 | Pistriotto et al. | |
| 6,292,833 B1 * | 9/2001 | Liao et al. .................. | 709/229 |
| 6,401,085 B1 | 6/2002 | Gershman et al. | |
| 6,424,841 B1 | 7/2002 | Gustafsson | |

(Continued)

FOREIGN PATENT DOCUMENTS

JP    1801167    1/2006

(Continued)

OTHER PUBLICATIONS

International Search Report and the Written Opinion of the International Searching Authority for PCT/US06/44284 daetd Mar. 25, 2008.

(Continued)

*Primary Examiner*—Ranodhi N Serrao
(74) *Attorney, Agent, or Firm*—Perkins Coie LLP

(57) ABSTRACT

A method for effecting the execution of an application function on an application server from a client device includes receiving from the client device at a proxy server a first message that pertains to a request to execute an application function, and that conforms to a text-based user-to-user messaging protocol, and that includes a human-readable input parameter. The method also includes authenticating a user associated with the first message origination address by sending an authentication message to the user at a message confirmation address, and receiving confirmation from the user responsive to the authentication message. If the user is authenticated, the method further includes generating a second message using the human-readable input parameter and transmitting the second message to the application server.

32 Claims, 10 Drawing Sheets

1 - Check for blacklist sources - drop them
2 - Check for double-bounce - drop them
3 - Authenticate Key?
4     YES - Reply, Add user to DB
5 - Known User ?
6     No - generate key, send welcome message
7     Yes - Parse Request
8 - Process or Forward request

U.S. PATENT DOCUMENTS

| | | | |
|---|---|---|---|
| 6,771,971 B2 | 8/2004 | Smith | |
| 6,938,087 B1 * | 8/2005 | Abu-Samaha | 709/227 |
| 6,959,185 B1 | 10/2005 | Stage | |
| 7,020,685 B1 * | 3/2006 | Chen et al. | 709/204 |
| 7,302,254 B2 | 11/2007 | Valloppillil | |
| 7,343,168 B2 | 3/2008 | Valloppillil | |
| 7,480,723 B2 | 1/2009 | Grabelsky et al. | |
| 2001/0032232 A1 * | 10/2001 | Zombek et al. | 709/201 |
| 2003/0163540 A1 | 8/2003 | Dorricott | |
| 2003/0200272 A1 | 10/2003 | Campise et al. | |
| 2003/0227892 A1 * | 12/2003 | Cabana | 370/338 |
| 2004/0030897 A1 * | 2/2004 | Hua et al. | 713/170 |
| 2004/0039827 A1 | 2/2004 | Thomas et al. | |
| 2004/0092272 A1 | 5/2004 | Valloppillil | |
| 2004/0092273 A1 | 5/2004 | Valloppillil | |
| 2004/0193694 A1 | 9/2004 | Salo et al. | |
| 2005/0131832 A1 | 6/2005 | Fransdonk | |
| 2005/0193130 A1 * | 9/2005 | Logue et al. | 709/229 |
| 2006/0277103 A1 | 12/2006 | Fujita et al. | |

FOREIGN PATENT DOCUMENTS

| | | |
|---|---|---|
| KR | 1020040063420 | 7/2004 |
| KR | 1020050089524 | 9/2005 |
| KR | 1020060034983 | 4/2006 |

OTHER PUBLICATIONS

International Search Report PCT/US2008/009751 dated Mar. 4, 2009.

Notice of Allowance Mailed Jan. 15, 2010 in Co-Pending U.S. Appl. No. 11/422,317 filed Jun. 5, 2006.

Final Office Action Mailed Aug. 20, 2009 in Co-Pending U.S. Appl. No. 11/422,317 filed Jun. 5, 2006.

Notice of Allowance Mailed Dec. 3, 2009 in Co-Pending U.S. Appl. No. 11/422,318 filed Jun. 5, 2006.

Non-Final Office Action Mailed Sep. 8, 2008 in Co-Pending U.S. Appl. No. 11/422,317 filed Jun. 5, 2006.

Non-Final Office Action Mailed Sep. 15, 2008 in Co-Pending U.S. Appl. No. 11/422,318 filed Jun. 5, 2006.

Co-pending U.S. Appl. No. 12/191,795 filed Aug. 14, 2008.

Co-pending U.S. Appl. No. 11/422,317 filed Jun. 5, 2006.

Co-pending U.S. Appl. No. 11/422,318 filed Jun. 5, 2006.

* cited by examiner

1 - Request for permission
2 - Lookup user profile, get permission address
3 - Permission message with encrypted token sent
4 - Permission request returned + [extra password]
5 - Authentic request passed to Client App
6 - Results returned from Client/Server
7 - Results message returned to user 1 - Fake Request for permission
2 - Lookup user profile, get permission address
3 - Permission message with encrypted token sent
4 - Permission request REJECTED + [extra password]
5 - Confirmation that Client Application is protected 1 – Redundant Message Servers (smtp, sms, etc)
2 – Replicated Database of User Profile
3 – Many Request Servers, generic or specific-apps
4 – each with 1 or more Client App threads 1 – Check for blacklist sources – drop them
2 – Check for double-bounce – drop them
3 – Authenticate Key?
4      YES – Reply, Add user to DB
5 – Known User ?
6      No – generate key, send welcome message
7      Yes – Parse Request
8 – Process or Forward request 1 - Web Services offer structured access
2 - Simple scripts allow unstructured access
3 - Programming to client API, if required
4 - Scripted Visual-API offers access to existing apps without expensive programming.

1 - Configuration runs "clairmail.com" service with public User Profiles database.
2 - Replicate for "customer.clairmail.com" with it's own User Profile data and optional private/VPN to customer data.
3 - Install on-site for "clairmail.customer.com"

1 - Internet-facing servers also run web apps.
2 - Web Apps administer User Profile Database and email queues, logs, blacklists, etc.
3 - Client app machines use remote control

ARCHITECTURE FOR GENERAL PURPOSE TRUSTED PERSONAL ACCESS SYSTEM AND METHODS THEREFOR

RELATED APPLICATIONS

This application claims priority under 35 U.S.C. §119(e) of the co-pending U.S. provisional application Ser. No. 60/633,327 filed on Dec. 3, 2004 and entitled "ARCHITECTURE FOR GENERAL PURPOSE TRUSTED PERSONAL ACCESS SYSTEM AND METHODS THEREFOR."

BACKGROUND OF THE INVENTION

The present invention relates in general to personal communication systems. More particularly, the present invention relates to architecture for general purpose trusted personal access system and methods therefor.

The mobile nature of today's workforce makes it often difficult to securely take advantage of internal network resources and applications when workers are away from their desks. One common communication technique may be email. Used throughout the enterprise and across organizational boundaries, email is used to communicate and request information or action.

Much like the telephone for voice communication, email has been adopted as a primary application for business, in particular for both remote and mobile access. In the enterprise, email tends to be the primary business communication platform and, hence, is almost always open on a user's desktop. It also tends to be the primary application for wireless users.

Email was originally developed as an electronic extension to regular physical mail, and as such is principally asynchronous and freeform. Asynchronous generally means that a process (e.g., sending an email) operates independently of other processes (e.g. receiving an email), whereas synchronous means that the process runs only as a result of some other process being completed or handing off operation (e.g., voice telephone conversation). An email message is generally composed by a first user, and sent to a second user, where it is queued in the second user's inbox to be subsequently read and possibly responded to at a later time. Freeform refers to the relatively small amount of standardized information in an email message. That is, aside from a few fixed fields (e.g., destination address, origin address, and subject etc.), the majority of the email document itself comprises the content or body. This is comparable to a physical mail message which generally only requires the destination address.

The person-to-person nature of email generally makes it not useful for access network resources (e.g., databases, sales tools, etc.) that require more sophisticated client applications with more robust user interfaces, such as a web browser. That is, errors are generally indicated by human readable text that is relatively freeform and not standardized, making it hard for program to program communication. In addition, many mobile wireless devices (e.g., cell phones, PDAs etc.) are relatively small, and hence problematic for the remote access of internal network resources. Current enterprise software platforms were not originally deployed for this type of access, and so, often require significant development, implementation and management expenditures to support access from these wireless devices.

Mobile devices generally present the user with a relatively poor user interface for applications other than voice, because of both battery duration and form-factor requirements. Although receiving messages is often relatively easy, with the exception of voice, small displays and keyboards make transmitting messages awkward and problematic. For example, sending a text message may take a substantial effort because of the relatively small size mobile keyboards. In addition, devices without full keyboards (such and the numeric keypads on most cell phones) practically restrict data transmission to short messages (e.g., SMS, etc.).

Screen size also tends to limit the use of conventional client/server applications and browsers. Existing applications and web-sites generally do not work with the small screens on mobile devices despite attempts to at screen panning or automatic conversion from HTML to WML. Some vendors have chosen to write new versions of their applications or web-sites especially for the mobile worker but this is non-trivial (one screen must become many mobile-screens) and therefore expensive to implement. Also, there is a lack of portability standards for mobile software and given the variety and rapid development of devices at the present time we should not expect to see this situation improve soon.

In view of the foregoing, there is desired an architecture for general purpose trusted personal access system and methods therefor.

SUMMARY OF THE INVENTION

The invention relates, in an embodiment, to a method for effecting the execution of an application function on an application server from a client device, the client device being coupled to a proxy server, the proxy server being further coupled to the application server that executes an application implementing the application function. The method includes receiving at the proxy server from the client device a first text message, the first text message including a text message destination address and a text message origination address, the first text message pertaining to a request to execute the application function. The method also includes authenticating a user associated with the first text message origination address by sending an authentication message to the user at a text message confirmation address that is different from the text message origination address and receiving confirmation from the user responsive to the authentication message. If the user is authenticated by the authenticating, the method further includes executing the application function at the application server as specified by the first text message, whereby the application function is ascertained based at least on the text message destination address.

The invention relates, in an embodiment, to a method for effecting the execution of an application function on an application server from a client device, the client device being coupled to a proxy server, the proxy server being further coupled to the application server that executes an application implementing the application function. The method includes receiving at the proxy server from the client device a first text message, the first text message including an text message destination address and an text message origination address, the first text message pertaining to a request to execute the application function. The method also includes authenticating a user associated with the first text message origination address by sending an authentication message to the user at a text message confirmation address that is the same as the text message origination address and receiving confirmation from the user responsive to the authentication message. If the user is authenticated by the authenticating, the method further includes executing the application function at the application server as specified by the first text message, whereby the application function is ascertained based at least on the text message destination address.

The invention relates, in an embodiment, to a method for effecting the execution of an application function on an application server from a client device, the client device being coupled to a proxy server, the proxy server being further coupled to the application server that executes an application implementing the application function. The method includes receiving at the proxy server from the client device a first message, the first message including a message destination address and a message origination address, the first message pertaining to a request to execute the application function. The method also includes executing the application function at the application server as specified by the first message, whereby the application function is ascertained based at least on the message destination address.

The invention relates, in an embodiment, to an architecture for enabling a client device to remotely execute an application function on an application server, the client device being coupled to a proxy server, the proxy server being further coupled to the application server that executes an application implementing the application function. The apparatus includes means for receiving at the proxy server from the client device a first text message, the first text message including an text message destination address and an text message origination address, the first text message pertaining to a request to execute the application function. The apparatus also includes means for authenticating a user associated with the first text message origination address by sending an authentication message to the user at a text message confirmation address that is different from the first text message origination address and receiving confirmation from the user responsive to the authentication message. If the user is authenticated by the authenticating, the apparatus further includes means for executing the application function at the application server as specified by the first text message, whereby the application function is ascertained based at least on the text message destination address.

These and other features of the present invention will be described in more detail below in the detailed description of the invention and in conjunction with the following figures.

BRIEF DESCRIPTION OF THE DRAWING

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
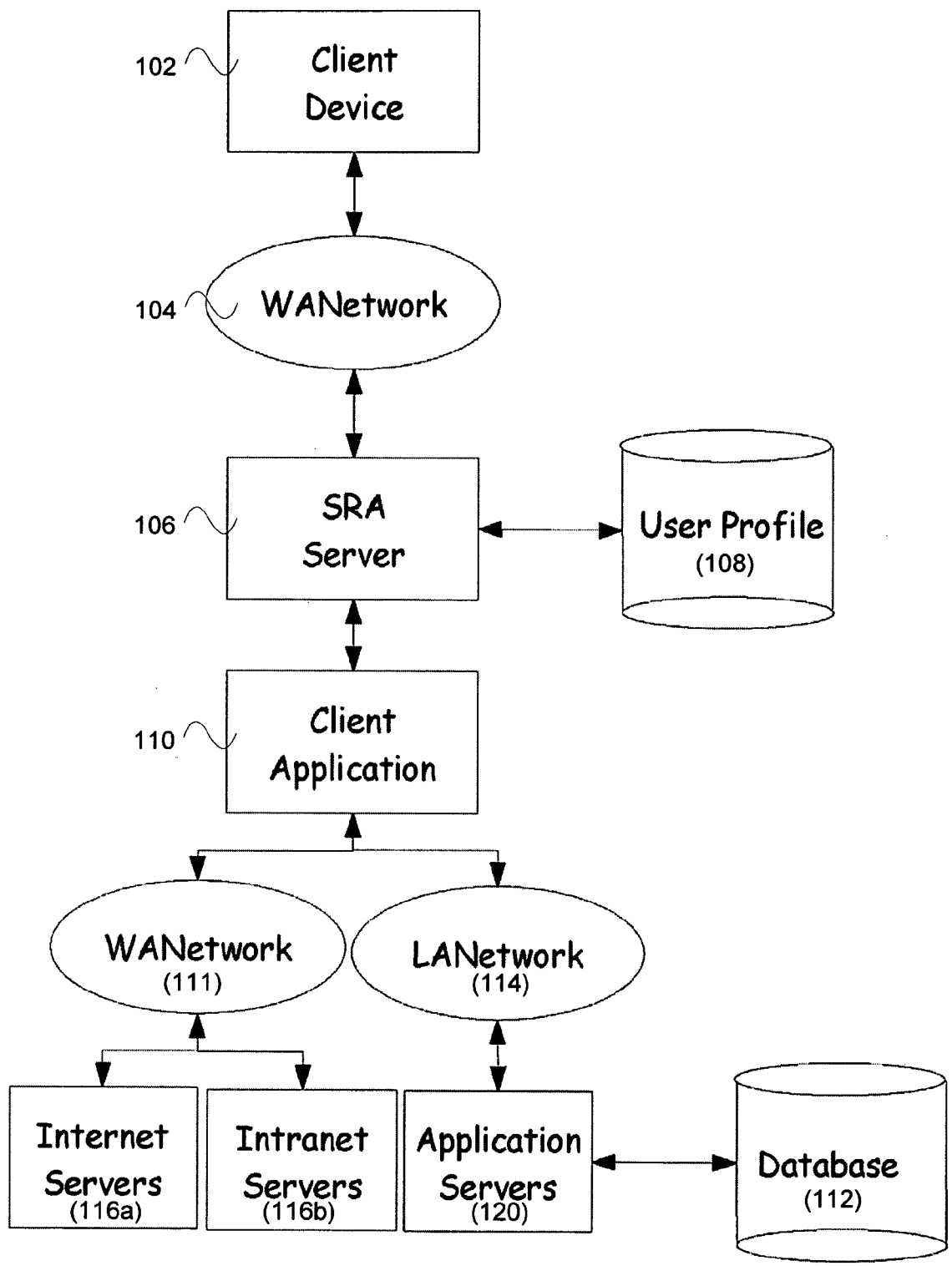
FIG. 1 illustrates a simplified diagram of the ClairMail architecture, illustrates according to one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

In accordance with one embodiment of the present invention, a ClairMail architecture is advantageously employed to facilitate enhanced information access and retrieval. In a non-obvious fashion, text-based messaging (e.g., email, SMS, etc.) may be extended beyond the person to person communication form, providing both a platform and service directed access to "things" such as transactions, application data or resources on the web. Information access and retrieval can generally be either trusted or non-trusted. Trust generally refers to the degree of confidence that a first party has as to a second party's intent to abide by stated system of rules (e.g., privileges, restrictions, rights, etc.).

In general, the ClairMail architecture generally distinguishes between three types of requests: non trusted, trusted origin, and highly trusted. If the information being transferred between two parties is not particularly valuable in comparison to its general disclosure, or is generally non sensitive in nature, a non-trusted relationship is generally established. Non trusted request may be accepted from anyone/anywhere and results are returned to the sender. This is the simple open or public type of transaction. In one embodiment, the ClairMail architecture may be employed to create non-trusted services in which a text-based messaging address returns non-sensitive information (e.g., news, weather, traffic, etc.). For example, by sending an email to "cmNews@ClairMail.com" with a news topic as the subject of the email, a response may be received containing news on that topic.

Trusted origin requests may be accepted only from a provisioned user (including a set of trusted user addresses) maintained on a registered user list, or derived from an external source (e.g., LDAP, MS Active Directory, etc.). Any request not properly authenticated is subsequently rejected (e.g., spam, etc.), and any reply may only be returned to the appropriate trusted address (and not necessarily to the sender). An SMS address is particularly useful as a reply address since it is unique to the device.

In that way, an unregistered intruder attempting to spoof the ClairMail architecture as a registered user will be detected, and hence not be able to receive confidential information in a reply. In addition, a trusted user address scheme is also resistant to a man-in-the-middle attack. That is, a situation in which a third party, unknown to the other parties, intercepts a message from one party and forwards the message to a second party.

Highly trusted requests are trusted origin requests that require further sender authentication of transaction confirmation. For example, a highly trusted request may be used to transfer funds between bank accounts. A confirmation message may initially be sent to the pre-arranged 'authentication address.' As in a trusted request, a registered user defines an address where these confirmation messages are sent, which is not necessarily the same device or protocol from which the request originated.

A confirmation message or authentication token (including a timestamp) that is valid for a short period of time may then be encrypted. Generally, a duration is chosen such that the time required to break the encryption is substantially larger than the time window in which the message is valid. The user may then reply to the confirmation message, perhaps adding some additional information, a personal identification number (PIN) for example, again making the system more secure. That is, if the encrypted message were intercepted, without the PIN, the transaction would not be authorized. Once the reply is received by the ClairMail architecture (and the PIN checked appropriately) the transaction is authenticated and executed and 'marked complete'. As described before, this final step is used to secure against a man-in-the-middle attacks, since a transaction may only be executed used once. For example, by typing "cmTransfer@ClairMail.com" with a transfer amount as the subject of the email, and replying to a confirmation, a user can initiate a transfer of funds between two pre-specified accounts.

In addition, a robust authentication mechanism also helps to substantially reduce spam (e.g., unsolicited bulk messages, etc.). Spam has unfortunately encouraged fraudulent advertising and solicitation using electronic messages, since virtually anyone can transmit a substantial number of emails at virtually no cost. Rising to a significant level of concern, most businesses must now protect their messaging systems from floods of spam, as well as avoiding becoming a source of spam themselves, by bouncing bad messages to wrong places.

For example, in an attempt to find a way to connect into the network from which a spammer is blocked, a message is sent from the spammer with a forged target user to an unknown address at a third site, from which it will bounce back to the supposed sender, in this case the forged target user. Thus a spammer may be able to get the spam message delivered by an innocent third party. In general, spam filters are only effective when the messages themselves are not forged. In fact, the most ardent spammers work hard to specifically defeat the spam filters.

The ClairMail architecture also uses authentication techniques to ensure that information is accessed and transactions executed on behalf of genuine users only. In particular, ClairMail may use an encrypted token which is sent to the client device. The user must reply quickly and correctly. The token expires within a few minutes, so an eavesdropper does not have time to decrypt. Once the user replies (optionally with additional password or PIN) the token is canceled, so an eavesdropper cannot copy and re-send the message. This technique assures authentic operations using only simple device, without the need for encryption/decryption in the mobile device. In general, relatively low performance processors are often used in mobile devices in order to increase battery life. Consequently, mobile devices tend not to be optimized for computationally intensive encryption/decryption tasks.

In addition, the ClairMail architecture may allow hosted access infrastructure for managed enterprise access to both internal and external sources. It further may provide a manageable infrastructure for directed transactional access to applications and web services allowing enhanced productivity and owner (total cost of ownership) TCO. In one embodiment, the ClairMail simple request access protocol gives secure directed text-based messaging access to applications and information, enhancing user productivity and reducing support and training costs. That is, no additional software need be installed on the user's desktop computer, laptop computer, mobile device, PDA, smart-phone, wireless-email-device, etc.

Typically, text-based messaging addresses can be created for "actions" or "transactions" within a platform that enables complex actions to be performed from a simple directed request. A single request may span multiple applications and provide a consolidated or coordinated result. Text-based messaging addresses stored in the users address book can now define request types. In addition, the requester associated information may come from the profile database at the ClairMail server, and history of requests can be logged.

In general, there are two methods of logging. In a first type, a client log may be maintained at a client device inbox, where a copy of all the sent and received messages are stored, to be accessed and searched later. In a second type, a server log may be maintained at the ClairMail server. It general, the server log records transaction information such as the user name, the task, the time, etc. Consequently the ClairMail server may provide a substantially high level of auditability that is often required by corporate governance guidelines and regulations, such as the Sarbanes-Oxley Act The ClairMail architecture optimizes traditional text-based messaging applications (e.g., email, SMS, etc.) with SRA (simple request access) address, avoiding the limitations of many other approaches such as synchronization, mini-browsers and expensive specialized client applications. Access functions traditionally missing in text-based messaging may be provided as simple alphanumeric text messages (or other sets of indicia) sent to ClairMail enabled server which, in turn, acts upon the messages and returns the required results using a simple electronic message. That is, a ClairMail server may act as the user's personal assistant, by acting as a proxy on the user's behalf.

In a non-obvious way, each ClairMail SRA message has its own unique address. Commonly used SRAs can be kept with the other traditional text-based messaging addresses in an address book for quick access with minimum key strokes. For example, a request might be: "What is the credit limit for customer XYZ?" or "Get a quote for stock symbol XXX?" or "Place order for 100 units of YYY for customer XYZ?" or "Sell 100 shares of stock XXX?"

In one embodiment, each of these requests could be sent to the appropriate address@server.com along with additional appropriate parameters (e.g., customer number/name XYZ, Stock Symbol XXX, number of units or shares to buy/sell, item number/name YYY, etc.). The structure of email, in particular, generally offers a large set of addresses which, in turn, provides a large namespace for transaction names.

In addition, although this approach may be optimized for a mobile device, it may be also used from any email-enabled or other messaging capable device. In an embodiment, the request can be sent as a SMS message. In an embodiment, the request can be sent as a web service message. In an embodiment, the request can be sent as IM (instant message). In an embodiment, a web interface may be used to send a detailed request. In an embodiment, multiple protocols may be combined for a given request. In an embodiment, the request may utilize a given protocol for a request, and a different protocol to return the results of the request. A URL of the address may then be bookmarked as a URL for easy retrieval.

In addition, SRA provides a relatively powerful yet simple secure user interface. In general, enterprise applications demand security and authenticity. Security requires that confidential information be kept private and away from eavesdroppers. Whereas authenticity requires that the message is from who it purports to be from. The ClairMail architecture enables substantially robust message authentication by generally accepting messages that contain trusted addresses. That is, unwanted messages or rogue senders can be detected and avoided.

Common message protocols (SMS, SMTP) are generally not secure, and thus can be easily intercepted and falsely replied to. One solution has been the use of public key infrastructure (PKI) techniques, wherein messages are encrypted at the source using a private key then decrypted at the destination using the sender's public key. Although today's mobile devices may have sufficient memory and compute power to use PKI, they generally do not provide mechanism for the secure keeping of private keys.

For example, since a private key (which may be very hard to guess) also tends to be relatively long and hard to remember, it is often secured on a mobile device with a relatively short and memorable PIN or personal identification number (which may be relatively easy to guess). Thus, the local storage of a relatively strong private key with a relatively weak PIN may inadvertently expose the rights and privileges of the device owner to anyone using the device who correctly guesses the PIN.

The ClairMail architecture may avoid the problems of key management in the mobile devices, avoids the differences between devices, avoids the fact that some have a lot of memory and some only little, some are programmed with C/C++ and some with Java, some have SIM cards and some do not, etc.etc. Instead, ClairMail builds upon a simple message protocol (such as SMTP) with a message exchange that passes an encrypted token with the option of using a PIN as well to secure requests. Consequently, computationally intensive encryption may be done at the server (which may have powerful sets of processors) instead of at the client device (which may have a relatively weak processor).

The ClairMail architecture also comprises a hardware/software combination that may be delivered either as a managed service or as an enterprise appliance installed within a firewall. The "front-end" of the ClairMail architecture may be a message server that receives and responds to requests from clients. The "back-end" of the ClairMail architecture comprises a request server, which processes the requests, and accesses the appropriate applications on behalf of the requester. The combination of the message server and the response server in general may function as a proxy server for each client. That is, the application may not necessarily be aware that it is interacting with the ClairMail architecture, as opposed to directly interacting with the client itself.

In one embodiment, the message server is the gateway between the external and internal system components, in addition to running the message services (SMTP, SMS, MMS, IM, XMPP, web service, SOAP, XML, WAP, WML, HTTPS, HTTP, etc.) In another embodiment it also runs the secure-web servers for remote-administration and a firewall. For maximum security, no other ports or network connections may be generally made available to the outside world. Message servers can be replicated for scalability and availability. The message server may run the authentication system using data stored in the profile database. Invalid messages are discarded or rejected. Valid messages may be acted upon immediately however, most messages are added to one of the persistent message queues, also stored in the database or on the file system.

In general, within the ClairMail architecture, message queues may be spread across different nodes of a computer cluster in a manner that is optimized for both data consistency and performance. That is, a particular message queue may be simultaneously modified from more than one source (e.g., add, delete, etc.), and yet still maintain a consistent state within the ClairMail architecture.

The request server takes messages from the persistent queues, extracts the input data/parameters from the message, adds profile information such as user credentials, and passes them to the client application. That is, the request server makes the desired information-access or executes the transaction specified by the request and returns results. The request server formats the results into a simple message and returns them to the user. Request servers can be replicated for scalability and availability. Each server takes the next message from the queue, and does not interfere with others.

Request servers can often use one or more client application machines to run the applications. Client machines can also specialized to run only one or a few applications. This is useful when the client applications need a lot of computing resources, or perhaps need dedicated access to external network connections or databases. In these cases, different queue are used. The message servers direct messages to the appropriate queue and only that set of request servers take messages from that queue.

The resulting system is substantially scalable in all aspects (e.g., message servers, request server and client application machines can all be replicated) ensuring substantially high availability, substantial scalability (from low-cost to high-capacity at the right price) with substantially easy maintenance and upgrade paths. In general, small, low-cost systems are needed for organizations with a small mobile workforce, yet large enterprises will exceed the capacity of a single computer.

The ClairMail architecture also enables substantially parallel operations. For example, the message server can be run on a single computer or a set of parallel computers. Additional computers can be added simply, at any time. A single logical database is used to hold the user-profile data and conventional database replication is employed to scale the capacity and performance as required. The request servers can run alongside the database in small installations or can be distributed across a set of servers to meet the needs of the largest. Client applications may be added to meet the workload and response times required.

The ClairMail architecture also enables 24×7 availability. By enabling inherent redundancy, ClairMail architecture allows both scalability and system availability in the event of failure of any one component. Messages can be processed by any of the message servers. For example, should any request server or client application machine fail, others will be available to continue the service. If one fails while processing a request, a timeout will occur and the next request server will take over automatically.

The ClairMail architecture may also be reliable. Reliability is a measure of the difference between expected system behavior and actual system behavior, including un-expected system input. The ClairMail architecture enables false messages to be rejected. In addition, since open systems are susceptible to denial-of-service attacks (DoS), the ClairMail architecture has special techniques to detect and respond to such attacks. Early identification of bad senders ensures that little computer resources (CPU time, memory, log files) are wasted and "tarpit" techniques are used to slow down multiple inputs from one place. Although genuine users are generally unaffected, rogue users are slowed down to a rate that cannot cause loss of service.

System monitoring and administration is also automated in order to keep costs low. When required, these monitoring and administration functions are available remotely using secure-web access. Suitably authorized users can manage ClairMail system from any web browser.

Referring now to FIG. 1, a simplified diagram of the Clair-Mail architecture is shown, according to one embodiment of the invention. The user operates the client device 102, commonly a mobile device such as a Blackberry or PDA or a laptop or even a non-mobile computer. A mobile phone, especially one of today's smart-phones, is fast becoming the mobile device of choice.

Client device 102 connects to the ClairMail SRA (simple request access) server 106 (proxy server) over some kind of wide area network 104, probably a combination of a wireless network and the Internet. SRA server 106 commonly comprises a message server [described below] and a request server [described below]. SRA messages are used to communicate the request much like a remote procedure call (RPC) mechanism is used with client APIs.

In order to take maximum advantage of the wide variety of devices and networks and to avoid the complexity of RPC protocols like CORBA, the ClairMail architecture may use human readable addresses and text for these messages. This substantially ensures access from all devices, since a simple messaging capability is all that may be required for security and authenticity.

SRA server 106 may maintain a user profile database 108 which is used for user authentication and personalization, wherein information such as user credentials may be stored and encrypted. For example, non-trusted requests, like "Get a quote for Stock with Ticker Symbol XXX" or "Look up a phone number" do not require authentication. Trusted request are verified against registered user list. Highly trusted requests, as previously described, usually require both verification against a registered user list, as well as a confirmation message or authentication token may initially be sent to the pre-arranged 'authentication address,' optionally with an additional PIN.

Once SRA server 106 receives a request message (authenticated if required), it may act upon it directly, it may connect over a WAN (wide area network) 111 (e.g., Internet, etc.) to publicly available internet servers 116a-b or it may pass the request on via LAN (local area network) 114 or a wireless network (not shown) to application servers 120, which may in turn be coupled to a persistent data store, such as database 112. For many requests, the SRA server will act upon behalf of the requester and uses data from the user profile database to access private information over the Internet or login to a client application 110 on behalf of the user. In an embodiment, access to client application 110 is done through the user interface, as the user themselves would do. For example, SRA server 106 may intercept GUI (graphical user interface) based transactions (e.g., text, mouse movement and clicks, etc.) that would normally be used by client application 110 to interact with a human user.

The requesters profile contains user names and optionally, passwords for each request, ensuring that private information (e.g., user names, passwords, etc.) may not be sent over the public WAN 111. In addition, the user profile database may be secured behind appropriate firewalls. In one embodiment, SRA server 106 may only have three or four ports open to the WAN (e.g. SMTP SMTP, SMS, MMS, IM, XMPP, web service, SOAP, XML, WAP, WML, HTTPS, HTTP, etc.) in order to maintain security. In another embodiment, the client application is part of a typical client/server enterprise application; the client connects over a local area network, probably inside the enterprise firewall, to the application servers and databases.

Figure 2:
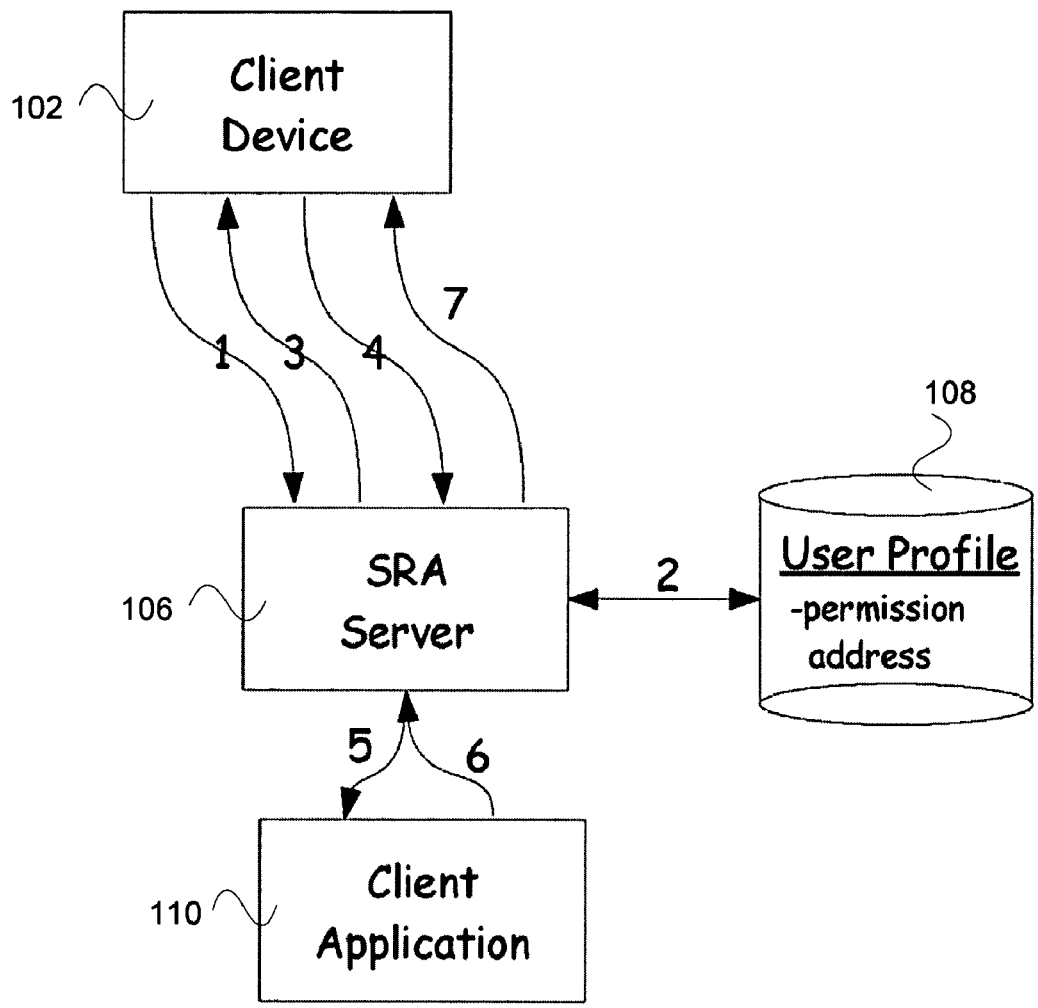
FIG. 2 illustrates a simplified diagram of the ClairMail authentication request mechanism, according to one embodiment of the invention.

Referring now to FIG. 2, a simplified diagram of the ClairMail authentication request mechanism is shown, according to one embodiment of the invention. Initially, client device 102 may send a SRA message to get permission for the access or transaction at 1. The SRA message can be created on the client device 102 with a form, which can be, for example, an Xform, HTML form, or WML form. SRA server 106 may use the name of the message sender to look up the user's profile 108 at 2. Part of the profile is the address used to get permission. Typically, this may be the same device, although it need not be, and may utilize a different messaging protocol.

SRA server 106 may then create an encrypted token and an associated mailbox using that token. The system may then send the authentication request back to the user at 3. Note, this mailbox address generally never existed before and will expire in a few minutes, so an eavesdropper may not be able to learn about this beforehand and may have only a few minutes to try to crack the encrypted token. The choice of token key length and short time-to-expire substantially ensures security. Client device 102 (the user) replies to the authentication request, adding an additional PIN for the more secure requests. Once SRA server 106 receives the authentication reply at 4, the temporary mailbox may be destroyed and the original request is generally marked as authentic. SRA server 106 may then pass the request on to the appropriate client application 110 at 5, and returns the results to the SRA server 106 at 6, and then finally to client device (and the user) at 7.

Figure 3:
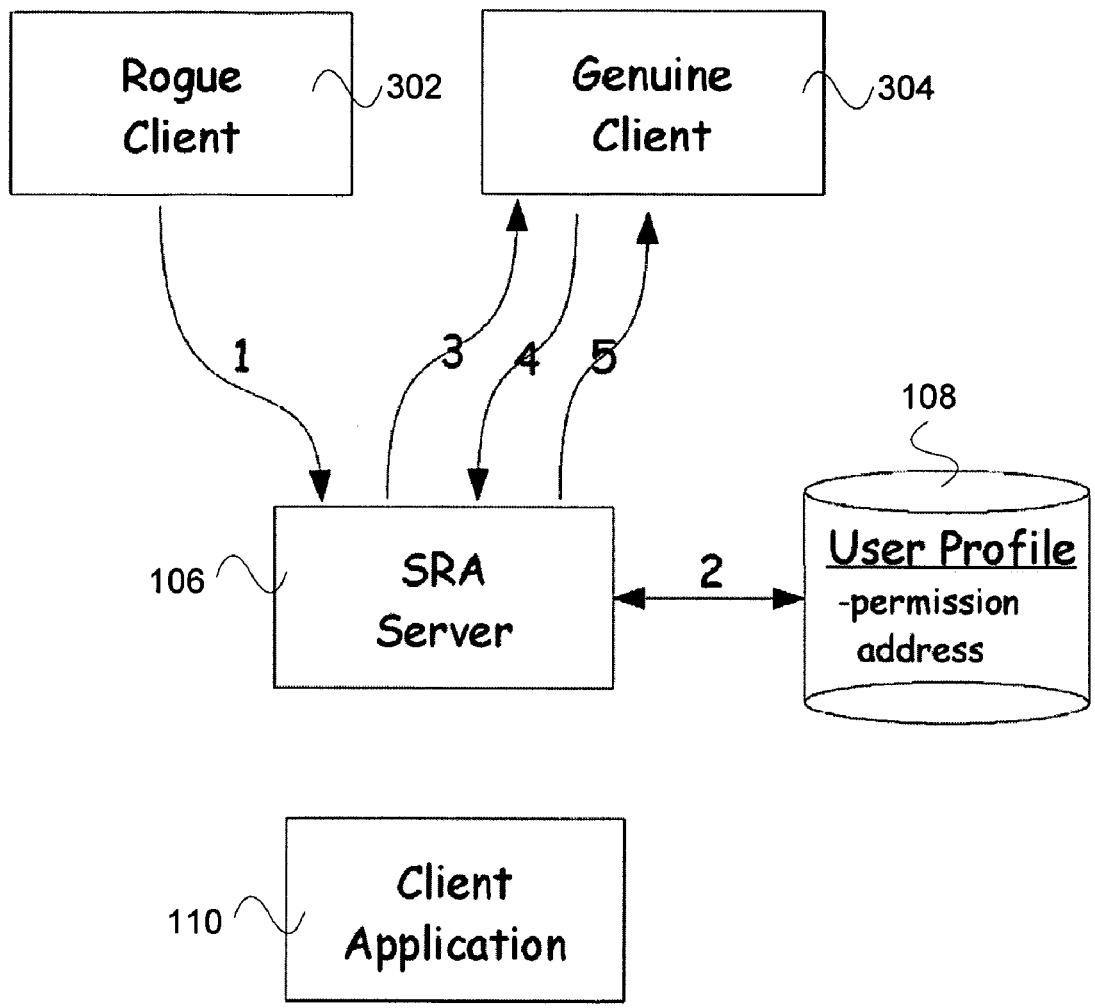
FIG. 3 illustrates a simplified diagram of the authentication mechanism of FIG. 2 in which a rogue request is made, according to one embodiment of the invention.

Referring now to FIG. 3, a simplified diagram of the authentication mechanism of FIG. 2 in which a rogue request is made, according to one embodiment of the invention. Rogue client 302 attempts to penetrate the ClairMail architecture by sending a request to SRA server 106 with a forged the "From:" address at 1. SRA server 106 may then look up the user in the profile for authentication. An encrypted token and a temporary mailbox may then be created.

Subsequently, the authentication request is forwarded to one of the trusted addresses of genuine user 304 at 3. That is, the genuine user may receive a spurious authentication request and sending address. Genuine user 304 may then reply negatively at 4, and subsequently receive a confirmation message from SRA server 106 indicating that client application 110 is protected at 5. As previously described, the use of a set of trusted address allows SRA server 106 to operate as a spam-free message server, particularly when used with common internet protocols, such as SMTP, that can easily be forged.

Figure 4:
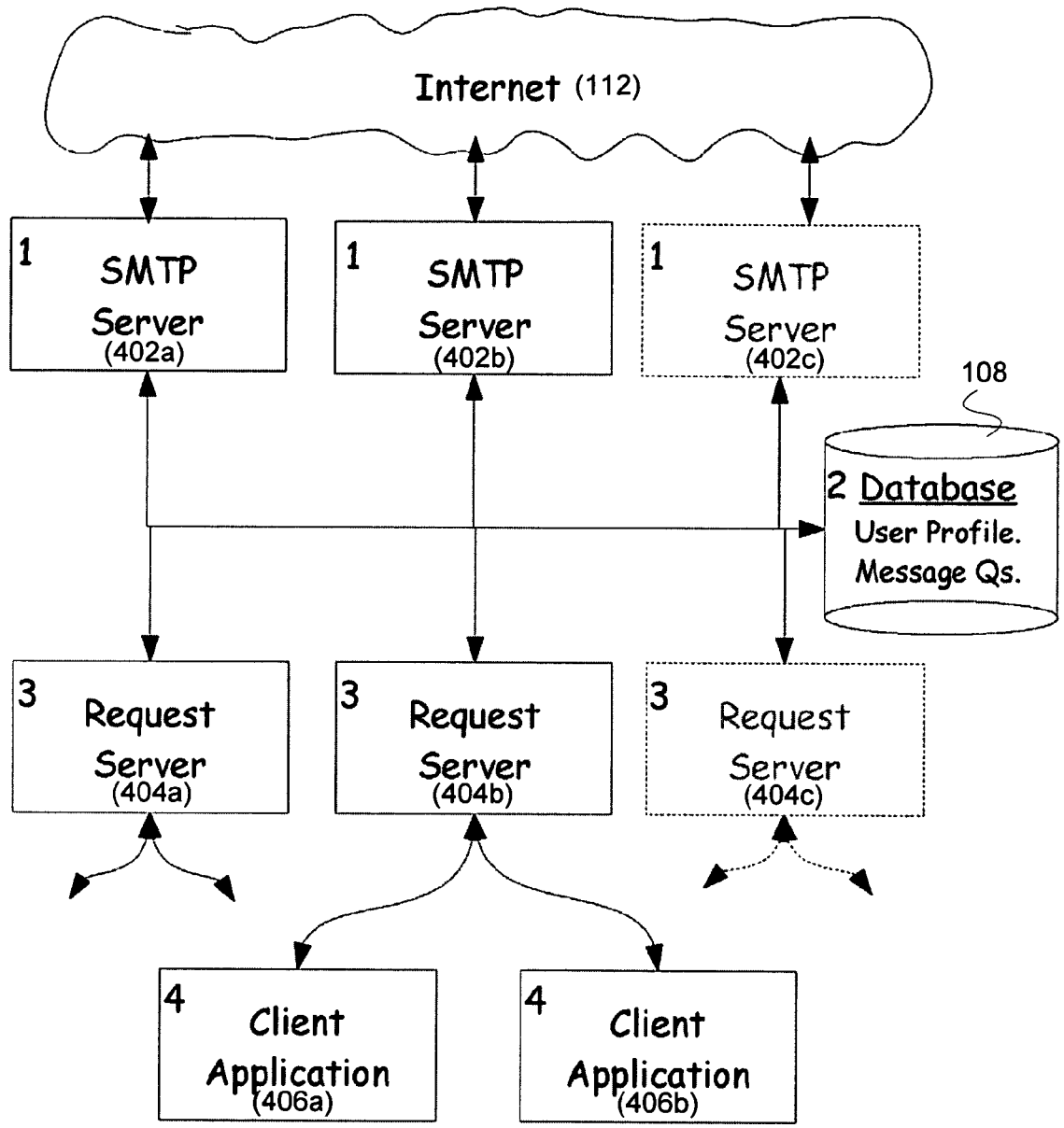
FIG. 4 illustrates a simplified diagram showing SRA scalability, according to one embodiment of the invention.

Referring now to FIG. 4, a simplified diagram showing SRA scalability is shown, according to one embodiment of the invention. In general, all components of SRA server 106, as shown in FIG. 1, can be scaled up to meet arbitrary demands for performance and availability, which is important not only to meet the needs of a large enterprise but also to deploy the right-sized system at the lowest cost with simple growth paths.

The SMTP servers 402*a-c* may distribute load with conventional IP-spraying techniques such as round-robin DNS or Cisco's Local Director. The message queues, that may be stored on database 108, may be designed for multiple-readers and writers accessing over a network at the same time, with the minimum of necessary locking. This ensures high performance with high reliability. Capacity can be expanded by storing different queues on different systems.

Request servers 404*a-c* may take messages from their designated queues process them in turn, and subsequently forward the messages to the appropriate client applications 406*a-b*. Since as soon as one request is finished, the next is processed, the load may be naturally distributed. Fewer request servers may offer a lower-cost system that would have higher latency in response times when the system is busy. Generally more request servers 404*a-c* would keep latency to the minimum even when systems are busy, at additional cost. In addition, it may be easy to add request servers 404*a* on-the-fly, so systems can be scaled to meet the processing and performance needs.

Figure 5:
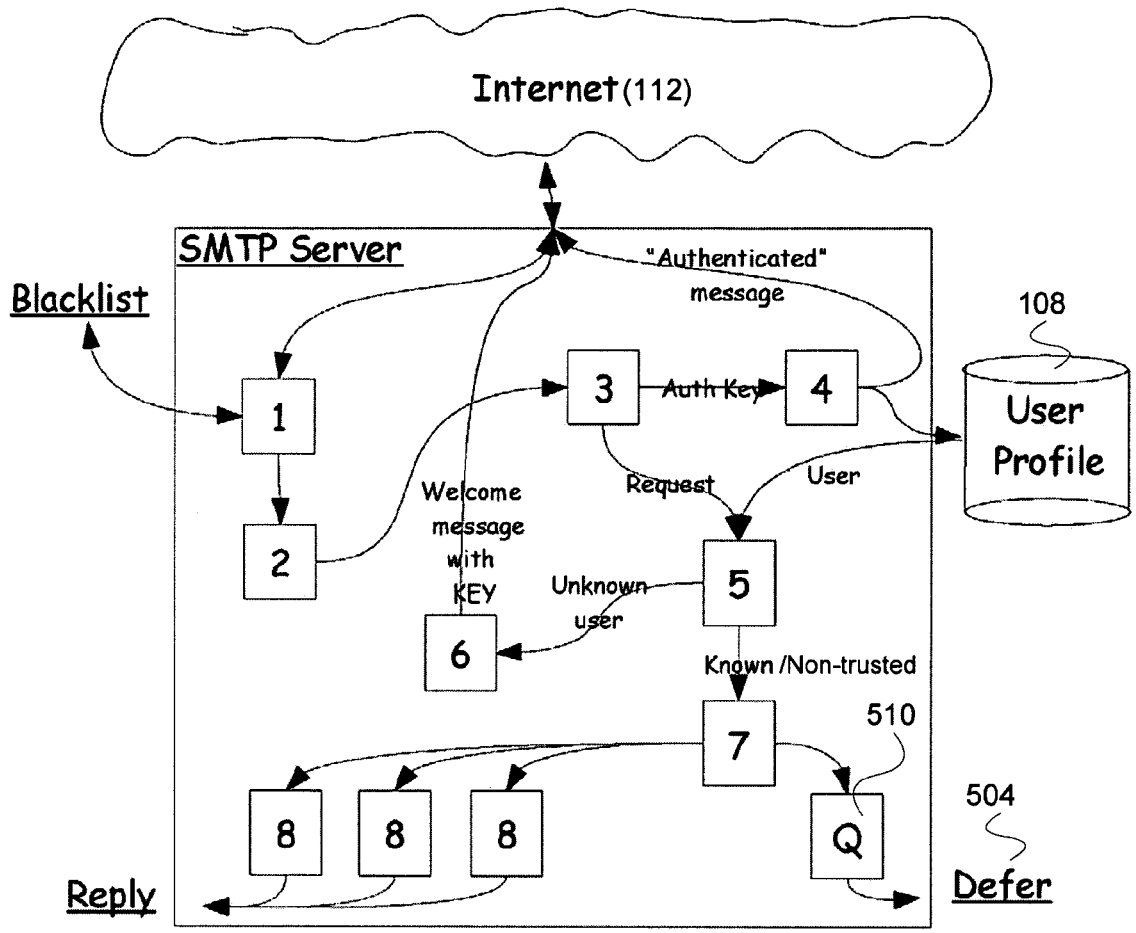
FIG. 5 illustrates a simplified diagram showing the ClairMail message protection mechanism, according to one embodiment of the invention.

Referring now to FIG. 5, a simplified diagram showing the ClairMail message protection mechanism, according to one embodiment of the invention. Incoming messages are screened so that minimal computing resources are wasted on rogue or error messages. This may help to prevent Denial of Service attacks as well.

Initially, the source IP address may be compared against blacklists 408 of known spam sources, and those messages are dropped immediately without even accepting the message into the system at 1. Several additional checks are made on the message protocol and header information—items that are often wrong on forged messages, such as no DNS MX record for the source IP address, no DNS entry for the source—and these too are immediately rejected at step 2.

A common function of the ClairMail authentication system may be to send 'bounce' messages back to the source—yet when the source is forged, the bounce message 'bounces' again. These double-bounce messages are generally errors (sometimes transient errors) so they are logged but processed no further. These early checks may reduce the load on the server and help protect it from DoS attacks. Each check can be enabled or disabled for everyone or for specific IP addresses or ranges of IP address. This is important, since we are in the unfortunate state today, where many large organizations fail to set up their message sending servers correctly (e.g. missing DNS entries, no reverse DNS, missing MX entries) and yet they are genuine message sources and need to be accepted. The ClairMail administrator may make these changed dynamically. Additional spam filtering may be available as well, however as the ClairMail authentication may work better, some of these checks are commonly disabled.

Next, authentication messages from previously unknown users are checked at 3. If a message is addressed to one of the special mailboxes with an encrypted name, and if it is a valid response (within timeout, with PIN if required, etc.), that user is 'authenticated' and their profile is added/updated in user profile 108.

An "authenticated" confirmation message is then returned to client device [not shown] at 4. The particular details of who may be authenticated can vary from system to system. A system open to the public, could authenticate all users (unless blacklisted). A private system might only allow users known in some other database/directory (e.g., LDAP, MS Active Directory, etc.) and may not need to utilize "authenticated" confirmation messages.

If the message is not an "authenticated" message, the message is checked to see if the user is known at 5 (i.e., the source address of the message matches one in the user profile database) or if non trusted access to this request is allowed. If not, the user is unknown and an authentication message may be generated (with an encrypted key) and returned to the user at 6. If the source address is forged or and invalid, this reply might be queued, lost or will bounce, so the source address remains unknown.

The request is then parsed and dispatched for appropriate processing at 7. Some requests may cause an immediate reply 406 at 8, while others may be placed on a persistent queue 510, where they are deferred 504 for further action.

Figure 6:
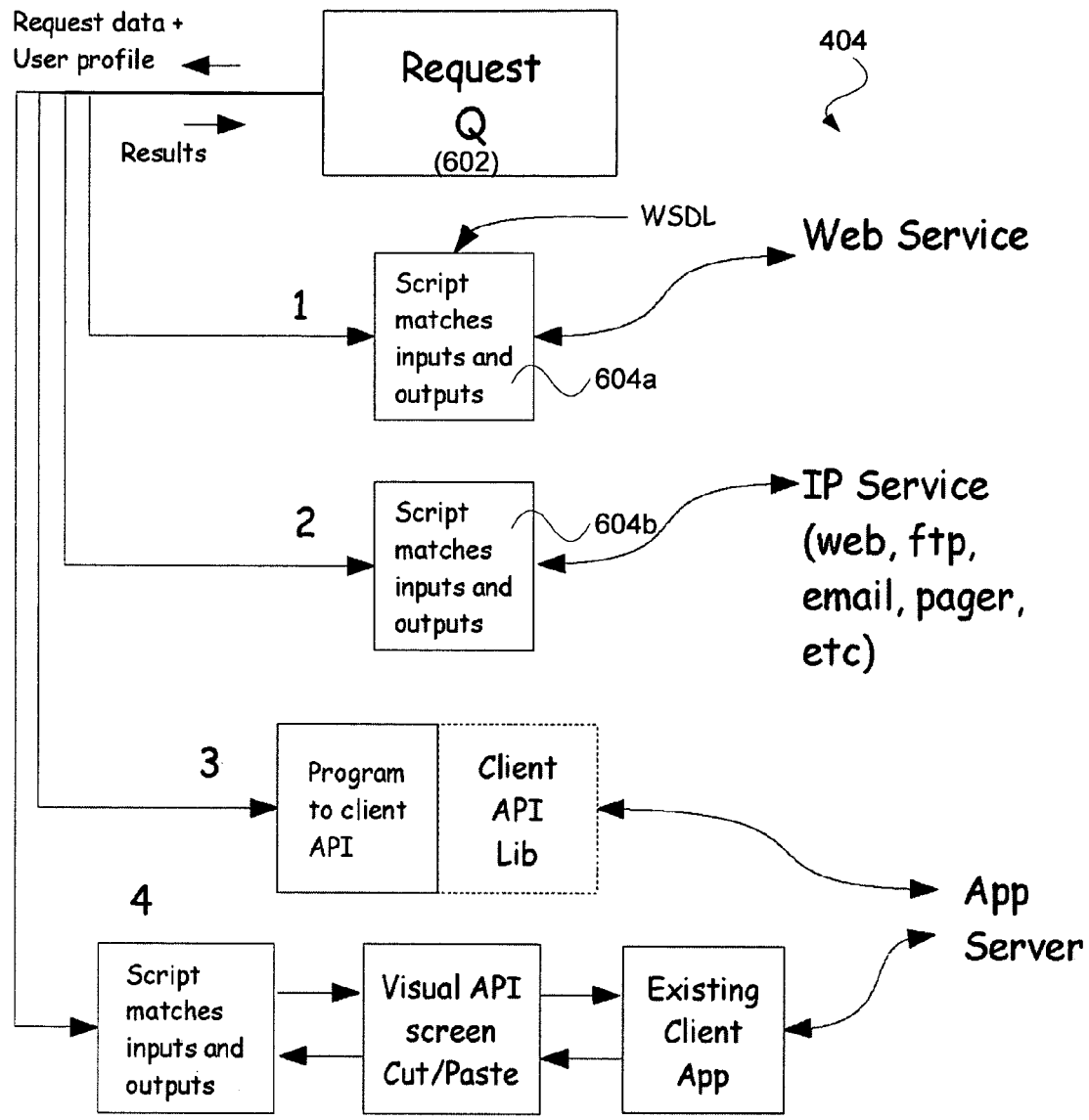
FIG. 6 illustrates a simplified diagram of a request server, according to one embodiment of the current invention.

Referring now to FIG. 6, a simplified diagram of a request server is shown, according to one embodiment of the current invention. Request server 404 generally takes the next request from a request queue 602 and depending upon the type of request, processes it as shown.

The ClairMail architecture uses rapid development techniques, usually in the form of simple scripts that match input and output parameters from the request message with the application interface. Complex requests may be built up from combinations of simple scripts, for instance "lookup product from UPC" and "get price quote for product" are combined to create a new request "get price quote from UPC". Note that the ClairMail architecture is designed to allow multiple request servers running in parallel. This is important for scaling systems to meet capacity requirements.

In addition, individual request servers can be specialized to handle specific requests which are important when special software or hardware installations are required. Type 1 requests generally represent the use of modern web services, structured requests made of HTTP guided by the Web Service Definition Language WSDL documents for each service. The ClairMail request server matches the unstructured input parameters from the message and copies them into the structured WSDL input parameters. Results from the Web Service request are extracted using the WSDL output parameters and put into the reply message for the user. A ClairMail script is used for this parameter matching permitting rapid script development and simple maintenance.

Type 2 requests generally represent the use of unstructured internet request, such as fetching a web page. In this case, the ClairMail script copies the input parameters into the appropriate request (an HTTP GET or POST, for instance) and also directs the extractions of returned results. Type 2 scripts are a little more complex than Type 1 scripts in order to deal with variations inherent in using unstructured requests and replies. Nevertheless, they tend to be much simpler than Type 3 requests (see next section) and still offer the benefits of the Rapid Development techniques.

Type 3 requests generally represent the conventional way to access application data from a new application—write a new client program. A program is written to take the input parameters from the request and pass them to the application using the API provided by vendor and then return the results. It is generally known that development and maintenance of new client programs may be substantially expensive, and so Type 3 requests are usually avoided in ClairMail Systems. Nevertheless, they are available as and when required, for example, if Type 1 and Type 2 are not available.

Type 4 requests generally represent a new, rapid-development approach to solve the problem of application access. It uses a novel "Visual API" using screen-scraping, cut and paste, and OCR techniques. A script directs the matching of input and output parameters to the input and output fields on the screens of an existing application. This component of the ClairMail server pastes the input parameters into the input fields and extracts output parameters as directed by the script.

Type 4 requests are used to access existing and legacy applications without the need for expensive programming. This method may leverage browser based or terminal session applications including Citrix, VNC, MS Terminal Server, VT100, etc. Scripts are generally simple, quick to write, and easy to maintain.

Figure 7:
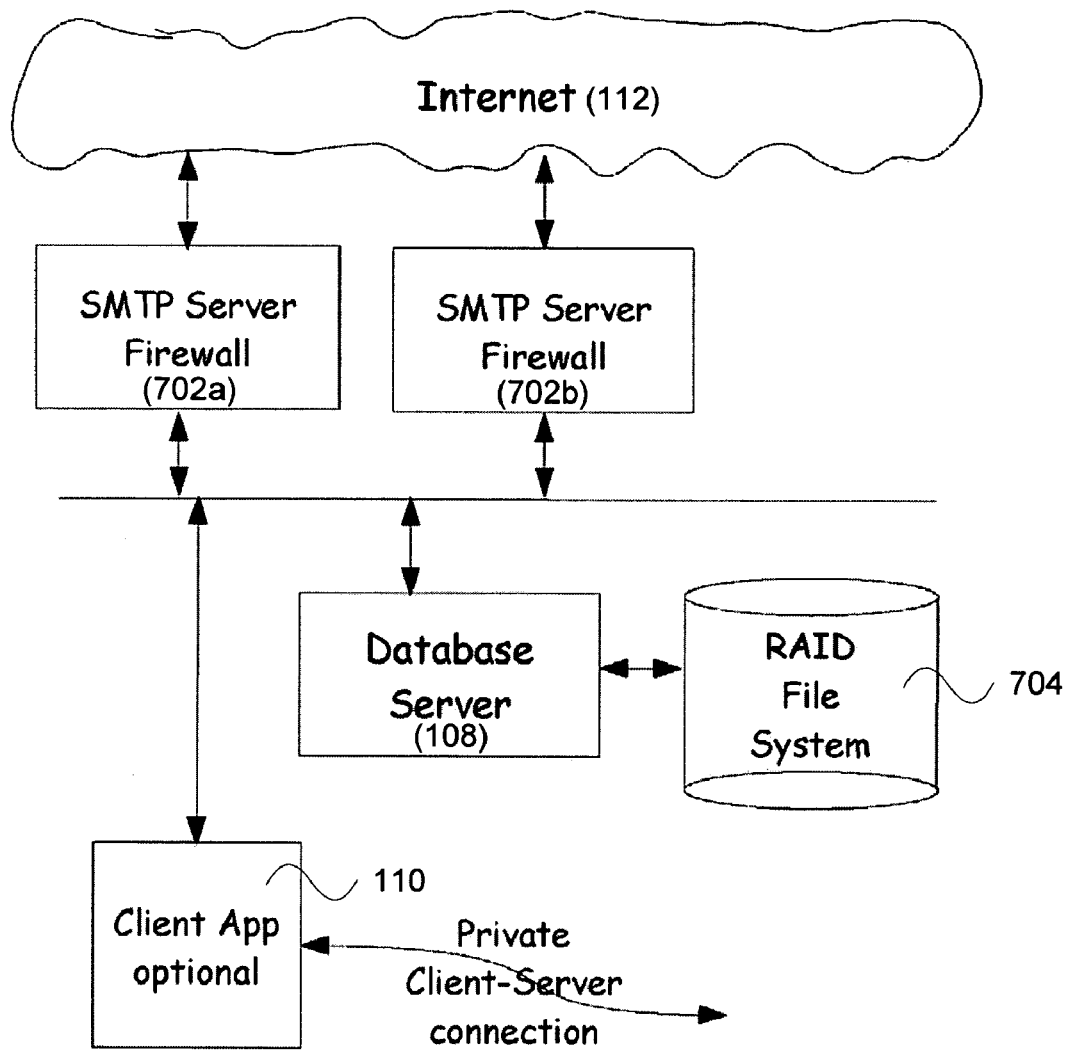
FIG. 7 illustrates a simplified diagram of a physical ClairMail server configuration, according to one embodiment of the invention.

Referring now to FIG. 7, a simplified diagram of a physical ClairMail server configuration is shown, according to one embodiment of the invention. The front end (facing Internet 112) may comprise two or more computers running the SMTP software as well as the firewall and web servers for administration 702a-b. A minimum of two servers is suggested for continuous availability in the event of failure or during maintenance.

Whereas the back end (facing the internal network) may run database server 108 which may be stored on a reliable file system. Larger systems duplicate the database server and replicate the database using conventional database techniques for high availability, such as RAID file system 704 (redundant array of independent disk). Additional machines are included as required to run the client applications. Some of these may require access to the enterprise servers. This is usually done using a private network connection, or perhaps via a virtual private network (VPN), over the public internet. Although the front end and back end ClairMail servers may run the Linux operating system, client application 110 may run on different operating systems, such as Microsoft Windows, since it hosts many applications.

For example, ClairMail Inc. runs the public ClairMail service@clairmail.com which is open to the public and registered users. Enterprise customers run a complete ClairMail system for their own users which may be run by ClairMail Inc. on behalf of a customer as a managed service, or installed at the customer's site.

Figure 8:
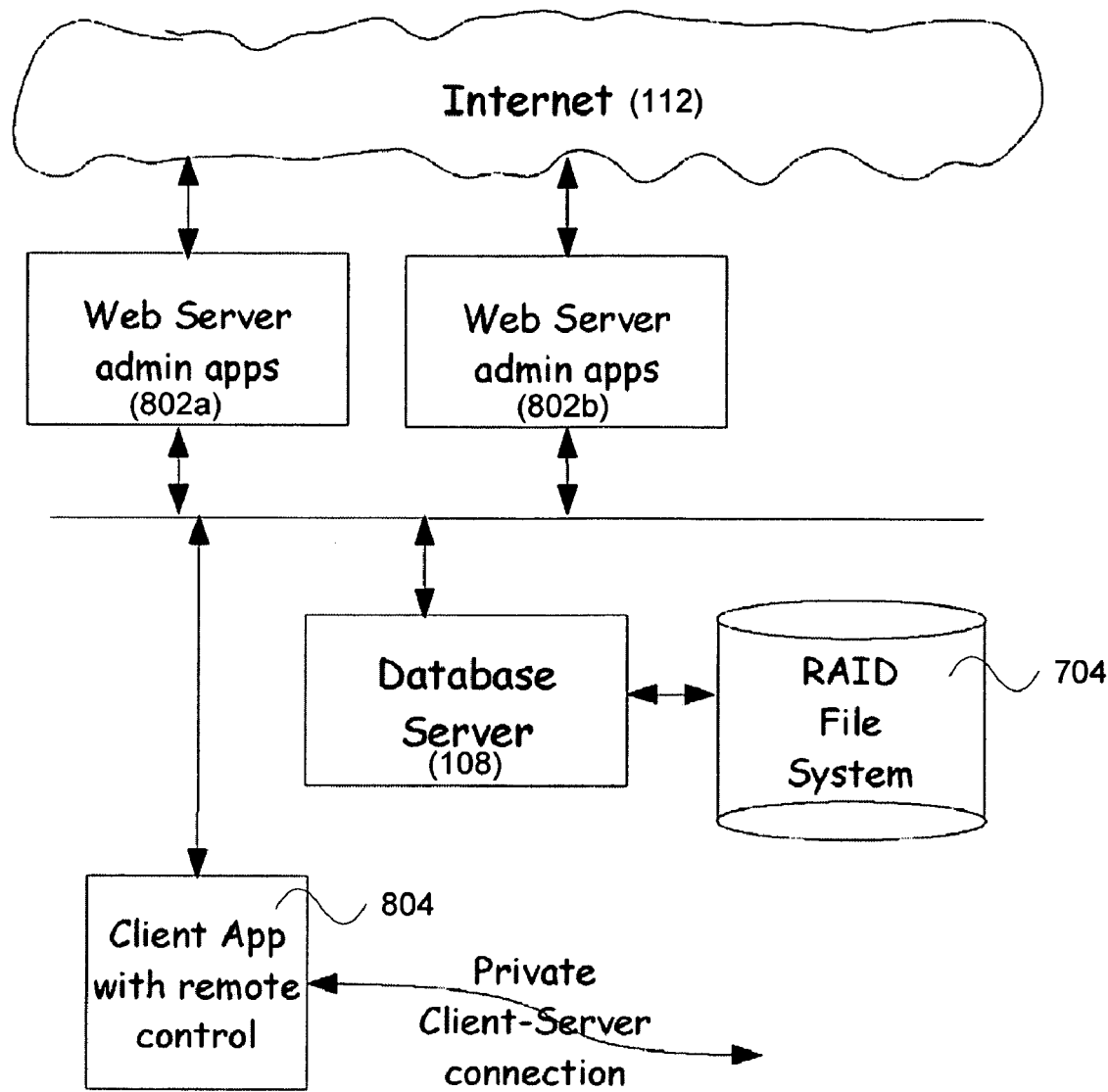
FIG. 8 illustrates a simplified diagram showing administration of the ClairMail architecture, according to one embodiment of the invention.

Referring now to FIG. 8, a simplified diagram showing administration of the ClairMail architecture, according to one embodiment of the invention. In general, all of the server functions of a ClairMail system may have remote administration built-in. A secure network interface (e.g., HTTPS, SSH, etc.) may be hosted on the message servers and used to access the web server administration applications 802a-b which include the ClairMail simple request access database, the message queues, system logs, blacklists etc. In addition, client application 804 may also have integrated remote control functionality. Remote administration of these machines is possible using either a remote control client application or via the web using a remote control applet. In general, ClairMail servers run un-attended. For example, log file rollover is automatic, message queues grow and shrink as required. When it is required, system monitoring and administration functions may be easily performed by any suitable authorized user from a web browser or management console.

Figure 9:
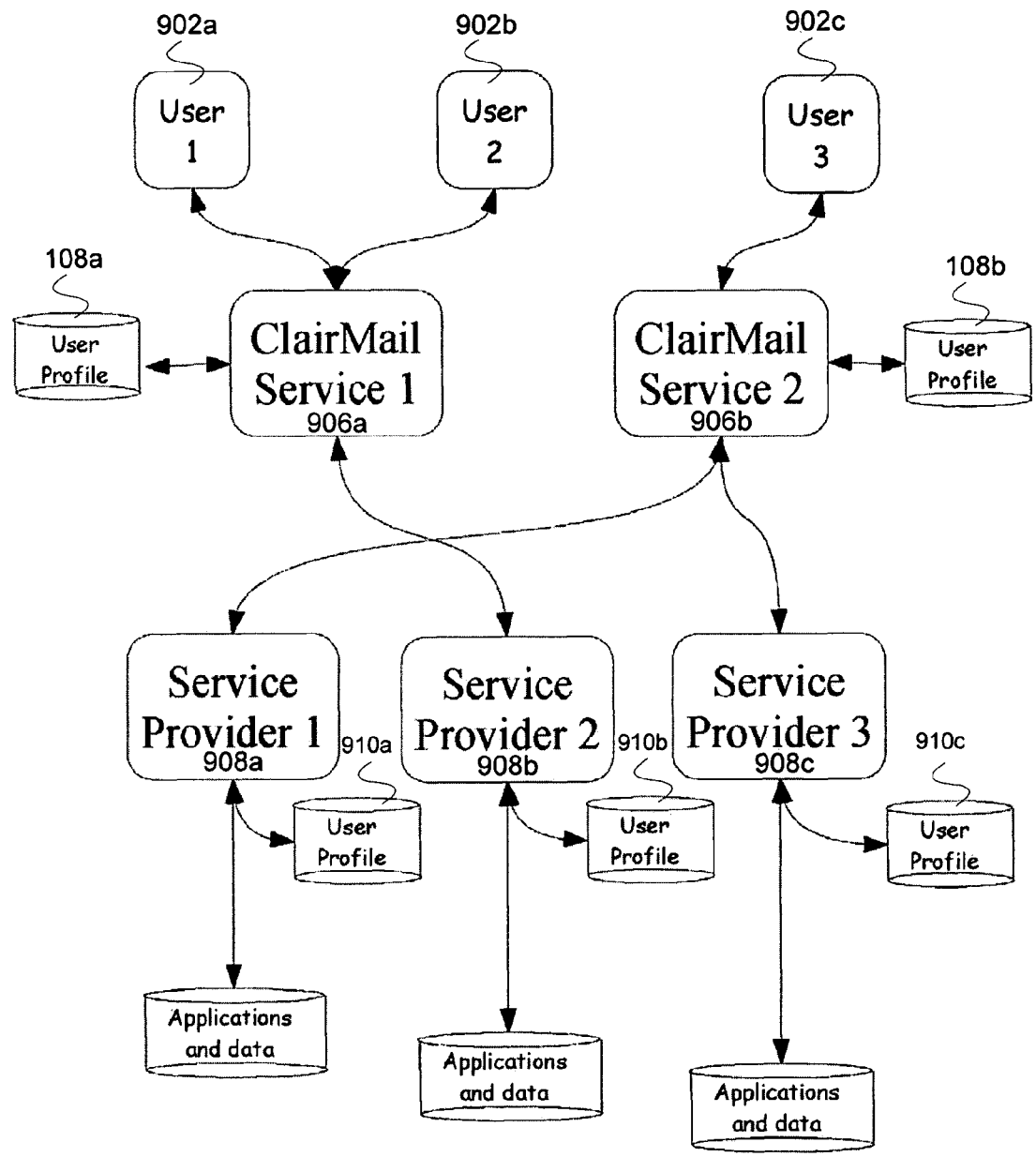
FIG. 9 illustrates a simplified diagram showing the use of web services with the ClairMail architecture, according to one embodiment of the invention.

Referring now to FIG. 9, a simplified diagram showing the use of web services with the ClairMail architecture, according to one embodiment of the invention. A web service is generally a standardized way of integrating Web-based applications using the XML, SOAP, WSDL and UDDI open standards over an Internet protocol backbone. XML is used to tag the data, SOAP is used to transfer the data, WSDL is used for describing the services available and UDDI is used for listing what services are available.

Web services allow different applications from different sources to communicate with each other without time-consuming custom coding, and because all communication is in XML, Web services are not tied to any one operating system or programming language. For example, Java can talk with Perl, Windows applications can talk with UNIX applications.

In this example, ClairMail services 906a-b are SRA servers 106 as shown in FIG. 1, that allow users 902a-c to access web services from web service providers 908a-c. That is, ClairMail services 906a-b are generally able to translate incoming text messages from users 902a-c into the appropriate web service protocol. ClairMail services 906a-b may accept a variety of input message types and protocols (SMTP, SMS, etc) from users 902a-c, as well as XML messages in the form of Web Service calls from service providers 908a-c. ClairMail services 906a-b can also publish the availability of their particular web services in the standard way using UDDI.

The ClairMail architecture may provide significant advantages for the both users 902a-c and service providers 908a-c, such as user profile caching. For example, user 1 902a has registered with ClairMail service 1 906a and given all necessary profile and preference information which is stored in the user profile database 108a. ClairMail service 1 906a can in turn access a web service from service provider 2 908b, and subsequently transfer a copy of the user 1 profile from user profile database 108a to service provider 2 908b user profile database 910b. Generally, the protocol between the ClairMail servers is secure and trusted. Once authenticated, the message may be passed securely (e.g. encrypted using SSL connections) to another server which can trust the user's authenticity.

Should user 1 902a want to add access to a new service provider, user 1 902a can direct ClairMail service 1 906a to connect to a new service provider using a web service protocol, and again transfer user 1 profile from user profile database 108a to the new service provider. Benefits to the user include avoidance of re-entering the same registration information, as well as maintaining a single copy of a user's profile (i.e., names, preferences, passwords, etc.). Benefits to the web service provider include a simplified security interface in which to interact with users.

Figure 10:
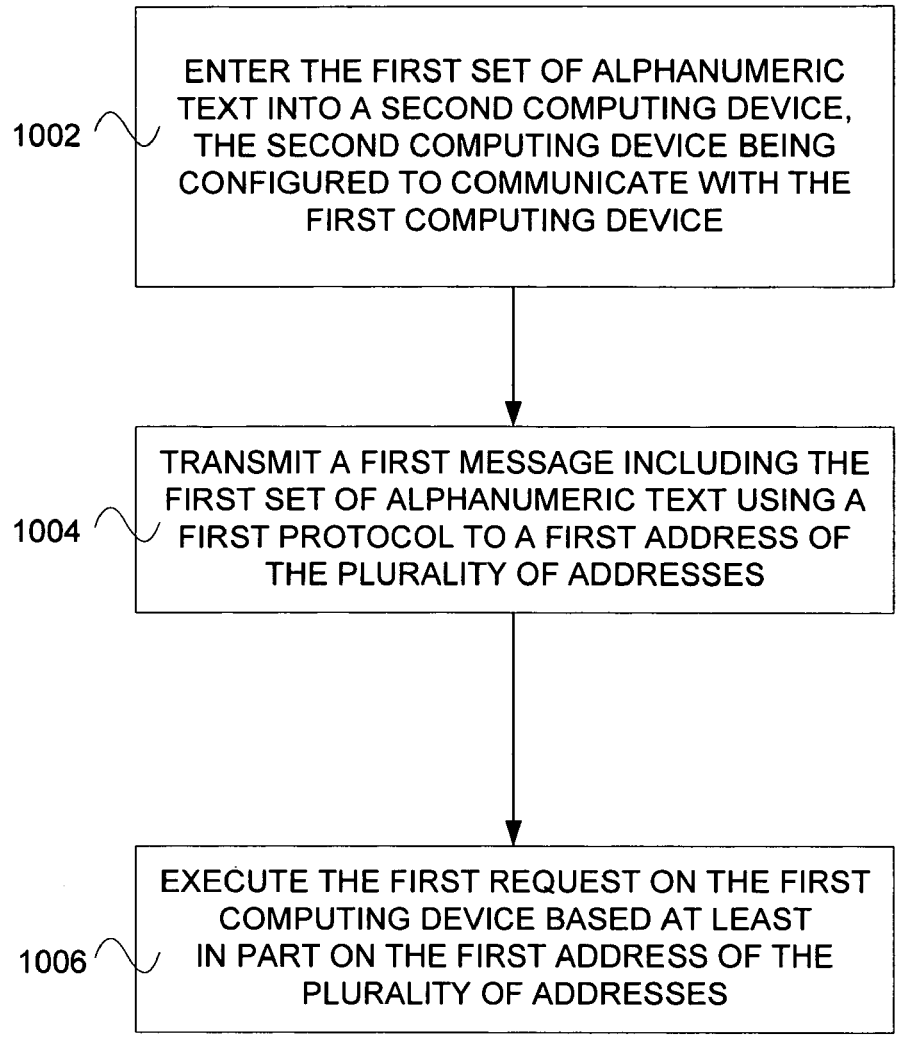
FIG. 10 illustrates a simplified diagram showing set of steps for effecting the execution of an application function on an application server from a client device, according to an embodiment of the invention.

Referring now to FIG. 10, a simplified method for effecting the execution of an application function on an application server from a client device, the client device being coupled to a proxy server, the proxy server being further coupled to the application server that executes an application implementing the application function, is disclosed, according to an embodiment of the invention. Initially, at 1002, a text message is received at an text message destination address at the proxy server from the client device. In an embodiment, the client device is coupled to the proxy server via a first network, and proxy server is coupled to the application server via a second network. In an embodiment, the first network is one of a wide area network, and a wireless network. In an embodiment, the second network is one of a wide area network, a wireless network, and a local area network. Next, at 1004, an authentication message is sent to a user at an text message confirmation address that is different from the text message origination address. In an embodiment, the authentication message is transmitted to the user using a first protocol that is different from a second protocol employed to transmit the text message from the user.

In an embodiment, the first protocol and said second protocol includes at least one of SMTP, SMS, IM, web service, SOAP, XML, HTTPS, and HTTP. In an embodiment, the text message confirmation address represents a non-persistent text message address that is configured to be inactivated after said authenticating. In an embodiment, the text message destination address is stored in a messaging address book on the client device. Finally, at 1006, if the user is authenticated, executing the application function at the application server. For example, the application function may include checking a credit limit, getting a stock quote, placing an order, selling shares of a stock, looking up a product from a UPC code, and getting a price quote for a product.

While this invention has been described in terms of several preferred embodiments, there are alterations, permutations, and equivalents which fall within the scope of this invention.

Advantages of the invention include architecture for general purpose trusted personal access system and methods therefore. Additional advantages include a hosted access infrastructure for managed enterprise access to both internal and external sources, a manageable infrastructure for directed transactional access to applications and web services, and enhanced productivity and lower total cost of ownership (TCO).

Having disclosed exemplary embodiments and the best mode, modifications and variations may be made to the disclosed embodiments while remaining within the subject and spirit of the invention as defined by the following claims.

What is claimed is:

1. A method for effecting the execution of an application function on an application server from a client device, said client device being coupled to a proxy server, said proxy server being further coupled to said application server that executes said application function, said method comprising:

receiving at said proxy server from said client device a first message, wherein said first message includes a first message destination address and a first message origination address, and wherein said proxy server is a final destination of said first message, and wherein said first message pertains to a request to execute said application function, and wherein said first message includes a human-readable input parameter; and wherein said first message conforms to a text-based user-to-user messaging protocol;

authenticating in said proxy server a user associated with said first message origination address by sending an authentication message to said user at a message confirmation address and receiving confirmation from said user responsive to said authentication message;

determining whether said user is authenticated by verifying whether said confirmation from said user is a message addressed to one of a plurality of special mailboxes with an encrypted name;

selecting in said proxy server said application server based at least on said human-readable input parameter of said first message;

selecting in said proxy server user associated information from a user profile database based at least on said first message;

generating in said proxy server a second message utilizing said human-readable input parameter and said user associated information, wherein said second message is for use by said application server; and transmitting to said application server from said proxy server said second message, to cause said application server to execute said application function based on said second message.

2. The method of claim 1 wherein said client device is coupled to said proxy server via a first network, and said proxy server is coupled to said application server via a second network.

3. The method of claim 2, wherein said first network and said second network are the same.

4. The method of claim 2, wherein said first network and said second network are not the same.

5. The method of claim 2, wherein said first network is one of a wide area network, and a wireless network.

6. The method of claim 2, wherein said second network is one of a wide area network, a wireless network, and a local area network.

7. The method of claim 2 wherein said first message further includes additional parameters in a body of said first message, and wherein said additional parameters are relevant to said execution of said application function, and wherein said additional parameters are expressed as alphanumeric text.

8. The method of claim 1 wherein said authentication message is transmitted to said user using a first protocol that is different from a second protocol employed to transmit said first message from said user.

9. The method of claim 8, wherein said first protocol and said second protocol includes at least one of SMTP, SMS, MMS, IM, XMPP, web service, SOAP, XML, WAP, WML, HTTPS, and HTTP.

10. The method of claim 1 wherein said message confirmation address represents a non-persistent message address that is configured to be inactivated after said authenticating.

11. The method of claim 1 wherein said authenticating employs at least one of a time-sensitive authentication token, a personal identification number (PIN), and a password.

12. The method of claim 1, wherein said first message destination address is stored in a messaging address book on said client device.

13. The method of claim 1, wherein said first message is created on said client device with a form.

14. The method of claim 13, wherein said form is one of an XForm, a HTML form, and a WML form.

15. The method of claim 1, wherein said message confirmation address is different from said first message origination address.

16. The method of claim 1, wherein said message confirmation address is the same as said first message origination address.

17. The method of claim 1, wherein said application server includes a graphical user interface, and wherein said proxy server is coupled to said application server through said graphical user interface.

18. The method of claim 1, wherein said application server includes an API, and wherein said proxy server is coupled to said application server through said API.

19. An apparatus for enabling a client device to remotely execute an application function on an application server, said client device being coupled to a proxy server, said proxy server being further coupled to said application server that executes said application function, said apparatus comprising:

a processor;

a memory;

means for receiving at said proxy server from said client device a first message, wherein said first message includes a first message destination address and a first message origination address, and wherein said proxy server is a final destination of said first message, and wherein said first message pertains to a request to execute said application function, and wherein said first message includes a human-readable input parameter; and wherein said first message conforms to a text-based user-to-user messaging protocol;

means for authenticating in said proxy server a user associated with said first message origination address by sending an authentication message to said user at a message confirmation address and receiving confirmation from said user responsive to said authentication message;

means for determining whether said user is authenticated by verifying whether said confirmation from said user is a message addressed to one of a plurality of special mailboxes with an encrypted name;

means for selecting in said proxy server said application server based at least on said human-readable input parameter of said first message;

means for selecting in said proxy server user associated information from a user profile database based at least on said first message;

means for generating in said proxy server a second message utilizing said human-readable input parameter and said user associated information, wherein said second message is for use by said application server; and means for transmitting to said application server from said proxy server said second message, to cause said application server to execute said application function based on said second message.

20. The apparatus of claim 19 wherein said client device is coupled to said proxy server via a first network, and said proxy server is coupled to said application server via a second network.

21. The apparatus of claim 20, wherein said first network and said second network are the same.

22. The apparatus of claim 20, wherein said first network and said second network are not the same.

23. The apparatus of claim 19, wherein said first network is one of a wide area network, and a wireless network.

24. The apparatus of claim 20, wherein said second network is one of a wide area network, a wireless network, and a local area network.

25. The apparatus of claim 20 wherein said first message further includes additional parameters in a body of said first message, and wherein said additional parameters are relevant to said execution of said application function, and wherein said additional parameters are expressed as alphanumeric text.

26. The apparatus of claim 19 wherein said authentication message is transmitted to said user using a first protocol that is different from a second protocol employed to transmit said first message from said user.

27. The apparatus of claim 26, wherein said first protocol and said second protocol includes at least one of SMTP, SMS, IM, web service, SOAP, XML, HTTPS, and HTTP.

28. The apparatus of claim 19 wherein said message confirmation address represents a non-persistent message address that is configured to be inactivated after said authenticating.

29. The apparatus of claim 19 wherein said authenticating employs at least one of a time sensitive authentication token, a personal identification number (PIN), and a password.

30. The apparatus of claim 19, wherein said first message destination address is stored in a messaging address book on said client device.

31. The apparatus of claim 19, wherein said application server includes a graphical user interface, and wherein said proxy server is coupled to said application server through said graphical user interface.

32. The apparatus of claim 19, wherein said application server includes an API, and wherein said proxy server is coupled to said application server through said API.

* * * * *